March 7, 1933.   A. F. GUSTAFSON   1,900,604
STOCK WATERING APPARATUS
Filed Sept. 4, 1928   2 Sheets-Sheet 1

INVENTOR.
Andrew Fred. Gustafson,
BY Earl T. Ragan
ATTORNEY.

March 7, 1933.  A. F. GUSTAFSON  1,900,604
STOCK WATERING APPARATUS
Filed Sept. 4, 1928  2 Sheets-Sheet 2
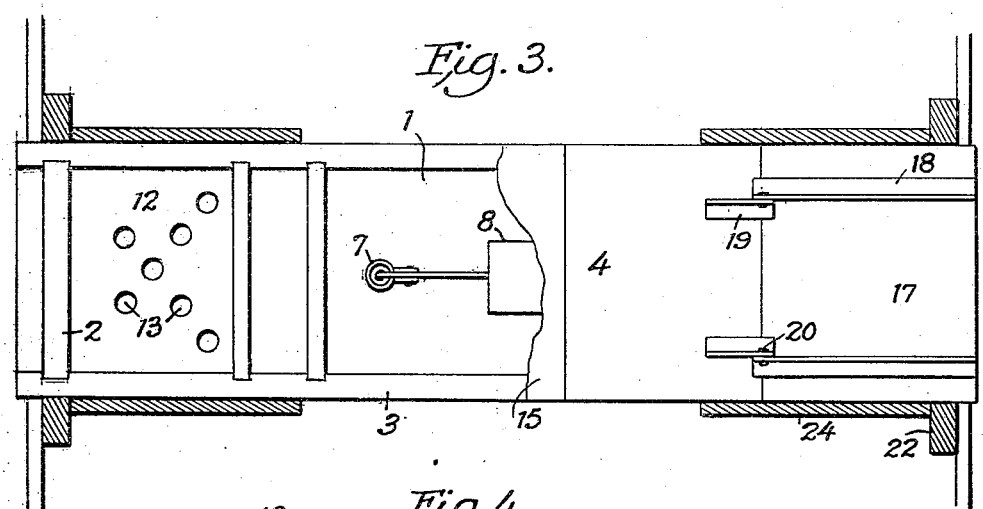
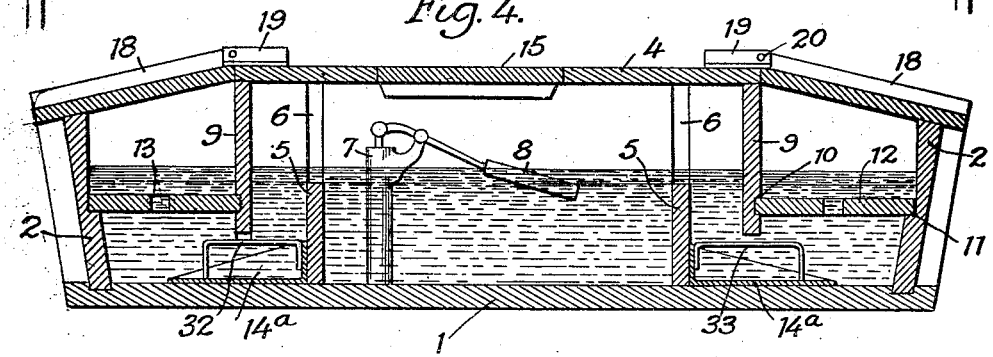
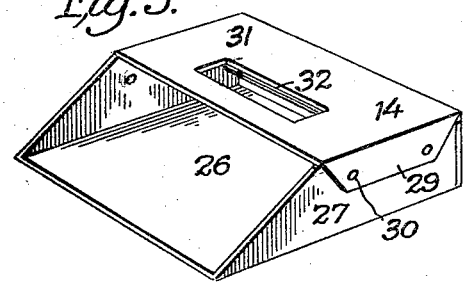
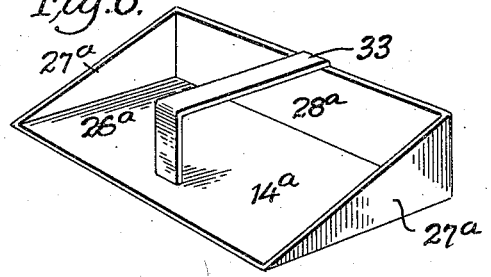
INVENTOR.
Andrew Fred. Gustafson,
BY Earl T. Ragan
ATTORNEY.

Patented Mar. 7, 1933

1,900,604

UNITED STATES PATENT OFFICE

ANDREW FREDERICK GUSTAFSON, OF CLARINDA, IOWA

STOCK WATERING APPARATUS

Application filed September 4, 1928. Serial No. 303,916.

My invention relates to stock watering apparatus, such as are adapted for stationary placement to provide a supply of drinking water for farm animals, which shall be readily available at all times.

It is an object of my invention to provide a durable device of this character which shall require a minimum of attention and which, in one preferred embodiment and arrangement, as hereinafter described, shall be particularly adapted for use in cold climates or where, at certain seasons of the year, the atmospheric temperatures may often be below the freezing point of water.

Other objects and advantages of my invention will in part be obvious and will in part be particularly pointed out in the following description in connection with the drawings, in which:

Fig. 3 is a plan view partly in section showing certain details of the apparatus;

Fig. 4 is a longitudinal median sectional view of the watering apparatus; and

Figs. 5 and 6 are views in perspective of two different forms of sediment scoops adapted for use in the apparatus as hereinafter described.

Figure 1:
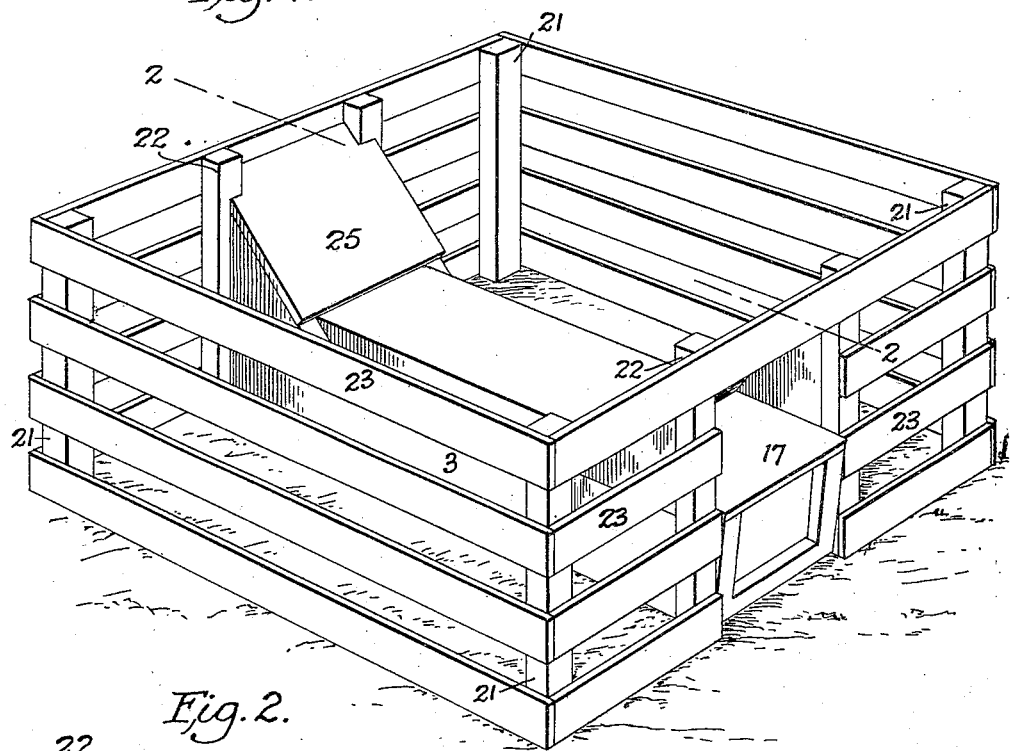
Fig. 1 is a view in perspective of a watering apparatus constructed in accord with my invention and surrounded by a fence or pen adapted to contain heating or heat-insulating or retaining material.

My improved watering trough, in a preferred embodiment as particularly shown in Fig. 4, comprises an elongated trough or body having a base 1, end-walls 2, side walls 3 and cover 4, all of which may be formed of wood, preferably cypress wood because of its durability.

Extending upwardly from the bottom of the tank or apparatus at suitable distances from its ends are vertical or upstanding partitions 5 which may be secured in grooves 6 in the side walls of the tank and in the central portion of the tank or apparatus a water supply pipe 7 is mounted, which may be connected to any suitable source of water supply (not shown) exterior to the tank. This water supply pipe 7 is provided within the tank with a suitable inlet valve controlled by a float 8, adapted to maintain a constant level of water within the tank, which level will preferably be slightly above the top of the partitions 5. Between the partitions 5 and the ends 2 of the tank additional vertical or depending partitions 9 are provided, which may extend downwardly from the tank cover 4 and the lower ends of which are positioned at a suitable distance above the bottom 1 of the tank but below the level of the upper ends of the partitions 5. These partitions 9, like the partitions 5, are preferably imperforate and may be mounted with their sides secured in grooves in the side walls 3 of the tank. On the side of each of these partitions 9, adjacent the lower end of the partition and facing the end of the tank, a groove 10 is provided, and in the ends of the tank and preferably at the same level as the lower edge of the groove 10 a ledge 11 is provided. Supported in the groove 10 and on the ledge 11 a baffle plate 12 is mounted, provided with a series of relatively small openings 13. Positioned on the bottom of the tank in the compartments formed by and between the ends 2 and the partitions 5 flat-bottomed scoops 14 or 14ª are positioned. At the top of the tank a removable section 15, centrally located in the cover 4, provides access when desired for inspection of the float valve or float or for other purposes. At the ends of the tank lids 17 are provided which are preferably hingedly connected to the main portion of the cover 4 and for this connection, in order to secure maximum simplicity, strength and durability, hinges may be employed as shown in Figs. 3 and 4, comprising angle irons 18 and 19 extending, respectively, across the top of the lid 17 and across a portion of the cover 4, the angle irons 18 and 19 being, as shown, suitably connected by rivets or bolts 20 so that they form both hinges and reinforcing and stiffening members.

Figure 2:
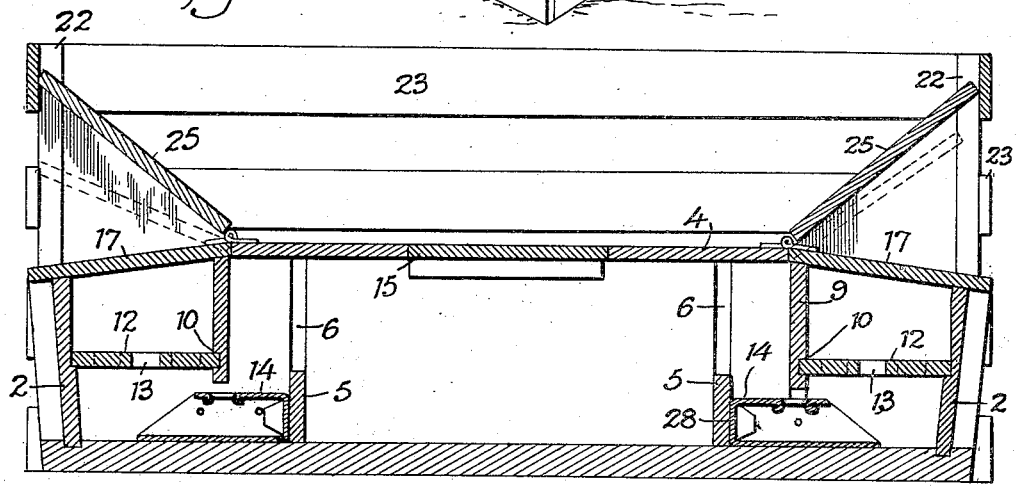
Fig. 2 is a longitudinal sectional view along the median line 2—2 of the apparatus as shown in Fig. 1.

In a preferred form of construction, as shown in Figs. 1 and 2, for use in climates where the temperature may fall below freezing, I provide a fence or pen surrounding the drinking trough, which may comprise uprights 21, 22 and horizontal boards or bars 23 bolted or otherwise secured thereto. The posts 22 in this case are mounted at the sides of the water trough adjacent its ends and may be secured to the sides of the trough if desired, as may also reinforcing members 24 extending inwardly from the posts 22 along the sides of the tank. Such of the side bars or boards 23 as would, if extended, interfere with the working of the lid 17 at the ends of the tank, are terminated at the posts 22 so as to avoid such interference and provide for free opening and closing of the lids 17 by raising and lowering on their hinges.

Attached to the posts 22 or members 24, or to both, are inclined baffle boards 25 extending downwardly and inwardly from adjacent the top of the fence or pen and with their lower ends adjacent the top of the tank.

The scoops 14 and 14$^a$ may be of either of two forms, as shown respectively in Fig. 5 and Fig. 6, the form shown in Fig. 5 being formed of a single piece of galvanized sheet metal or other material with flat bottom 26, upstanding side walls 27 and back 28 and depending side flanges 29, which may be secured to the upstanding sides 27 by rivets 30. In this form of scoop the top 31 is provided with a slot 32, the sides and ends of which may be of smooth and rounded form, provided by downwardly and inwardly turned portions of the sheet metal along the edges of the slot 32 which is thus adapted for use as a hand-hold in use of the scoop. Although this form of scoop is preferred, I may also provide a scoop, if desired, of the form shown in Fig. 6, which like the form shown in Fig. 5 may be formed of galvanized iron or other sheet metal or material suitable for the purpose and which may be formed with a flat bottom 26$^a$, triangular ends 27$^a$, a back 28$^a$ and a handle 33, which may be formed of sheet metal or other material and may, as shown, be connected with the back and bottom of the scoop and may be of suitable size to provide a hand-hold or grip.

Although my invention is, of course, not limited and I do not wish to be understood as limiting it to any particular dimensions or to the specific materials or sizes of material of which my device or any of its parts are made, I may, merely for the purpose of illustration, state that I have found it quite suitable to make the trough as described of a length of approximately six (6) feet, a width of fourteen (14) inches and a height between the bottom 1 and cover 4 of approximately ten (10) inches, the baffle plate 12 about ten (10) inches square and the other parts of the device being of a suitably proportioned size. These dimensions are suitable for a hog watering device but may be widely varied without in any manner departing from my invention.

When in operation and when constructed and installed as described with the water pipe 7 suitably connected to a supply of water, water will flow into the tank through the supply pipe 7 and will, in the first instance, fill that portion of the trough between the partitions 5 until it has reached the level of the tops of the partitions 5 and will then flow over the tops of the partitions 5 and into the compartments between the partitions 5 and ends 2 of the trough until the water throughout the entire length of the trough has attained a level somewhat above the tops of the partitions 5, when the flow of water will be thereafter automatically maintained at this level by the suitable intermittent operation as required of the float 8 and water supply valve which it controls.

The perforated baffle plates 12 will be positioned so as to be somewhat below the normal level of water as maintained in the trough and, in use, one or both of the hinged covers 17 will be raised, thereby providing access to the water in the drinking compartment adjacent the ends of the trough and above the perforated baffle plates 12.

When animals using the trough for their water supply have, by drinking, somewhat lowered the level of the water in the apparatus, the float 8 and connected water supply valve will be put into operation and the level of the water will be immediately restored by the temporary opening of the valve.

The baffles 12 serve the purposes, among others, of preventing accidental drowning of small chickens or the like, which might accidentally come or fall into the trough, as the depth of water above the baffles 12 will be so slight as to afford no danger of such accidents and at the same time, by reason of the relatively small size of its perforations 13 (which may suitably be about three-fourths of an inch in diameter), débris of any considerable size is prevented from falling into and obstructing the main portion of the trough, being retained on the baffle 12 whence it is readily observed and removed. Ordinary dirt or débris of sufficiently small size, which may enter the drinking compartments at the ends of the trough, will pass through the perforations 13 and will collect in the compartments at the ends of the trough below the baffles 12, either in the scoops 14 or 14$^a$ or on the bottom of the compartment itself, adjacent the scoops, and, when desired, the baffles 12, being as described loosely mounted in and on a groove 10 and ledge 11, may be temporarily removed from position and, by grasping the scoop 14 or 14$^a$ by its hand-hold, the scoop may be drawn over the bottom of the compartment toward its end, thence, with the collected sediment, removed from the trough temporarily, to discharge the collected sediment exteriorly of the trough.

The partitions 5 are preferably imperforate whereby to prevent any sediment accumulating in the drinking ends of the trough from entering the central compartment of the apparatus between the partitions 5 and the depending partitions 9 (which also are preferably imperforate) serve the purpose of reinforcing and strengthening the tank construction as an entirety and of supports for the perforated baffles 12 and also assist in keeping out of the central water supply compartment any dirt or the like entering through the openings at the ends of the apparatus used by animals for drinking.

For use in climates and at seasons where and when the atmospheric temperatures may fall appreciably below the freezing point of water, I preferably position the watering trough within a fence or pen as shown in Figs. 1 and 2, with the water supply compartment tightly covered, and place within this fence or pen and along the sides of the watering trough and over the main portion of its top a suitably thick layer or pile of heat-insulating material, such as earth, hay, straw or the like, or in most cases preferably a deposit of stable manure which, by reason of its heat-generating character which is retained for a considerable time, serves not only to prevent freezing of the water in the watering trough but also (unless the temperature is too extremely low) serves to provide a means of raising the temperature of the water in the trough to a point where it is most healthful and desirable for drinking by hogs or other animals.

What I claim is:

1. A stock watering apparatus comprising, in combination, a water supply compartment, a drinking compartment communicating with the water supply compartment, means for maintaining a substantially constant level of water in the compartments, a partition between the said compartments which partition is substantially impervious to sediment and has its top slightly below the normal water level in the apparatus, and another partition between the water supply compartment and the drinking compartment, said latter partition having a lower portion substantially impervious to sediment and being positioned with its lower edge below the normal water level in the apparatus but above the bottom of the compartments.

2. A stock watering apparatus comprising, in combination, a water supply compartment and a drinking compartment communicating with each other, means for maintaining a substantially constant level of water in the compartments, a partition between the compartments which is at least sufficiently impervious to prevent the passage of sediment through the partition and which has its top slightly below the normal water level in the apparatus, and another partition positioned between the first-menioned partition and the end of the drinking compartment, said latter partition having a lower portion substantially impervious to sediment and being positioned with its lower edge below the normal water level in the apparatus and below the level of the upper edge of the first-mentioned partition but above the bottom of the drinking compartment, whereby said partitions, together with the main walls and bottom of the compartments, form a baffle system and trap checking the passage of sediment or floating matter from the drinking compartment into the water supply compartment.

3. A stock watering apparatus comprising, in combination, a water supply compartment, a drinking compartment communicating with the water supply compartment, a partiton extending in a generally vertical direction and partially separating the two compartments, said partition having a horizontal groove on the side toward the drinking compartment and at a level below the level at which water is normally maintained in the drinking compartment, a wall for the drinking compartment opposite to the said partition, said wall being provided with a supporting ledge, and a foraminous, substantially horizontal baffle extending across the drinking compartment and supported at opposite edges by the said groove and the said ledge, respectively, so as to be readily removable when desired.

4. A stock watering apparatus comprising, in combination, a water supply compartment, a drinking compartment communicating with the water supply compartment, a partition extending in a generally vertical direction and partially separating the two compartments, said partition having a horizontal groove on the side toward the drinking compartment and at a level below the level at which water is normally maintained in the drinking compartment, a wall for the drinking compartment opposite to the said partition, said wall being provided with a supporting ledge, a foraminous, substantially horizontal baffle extending across the drinking compartment and supported at opposite edges by the said groove and the said ledge, respectively, so as to be readily removable when desired, and a removable sediment-collecting scoop having a lip positioned in slidable engagement with the bottom of the drinking compartment and accessible for use on removal of said horizontal baffle, the lip of said scoop being positioned a sufficient distance from one of the vertical walls of the drinking compartment as to permit a free movement of the scoop over the bottom of the drinking compartment.

5. A stock watering apparatus comprising, in combination, a drinking compartment, means for maintaining a substantially constant water level in the drinking compartment, and a removable sediment-collecting scoop located in slidable engagement with the bottom of the drinking compartment and having a sediment-collecting lip spaced from one of the vertical walls of the drinking compartment whereby said lip may be drawn across the bottom of the compartment and thereby to collect for removal any sediment accumulating on the bottom of the compartment.

ANDREW FREDERICK GUSTAFSON.